June 18, 1935. H. A. CENTERVALL 2,004,929
CONTROL MEANS FOR VARYING THE RELATIVE SPEEDS OF MEMBERS
DRIVEN THROUGH A COMMON DIFFERENTIAL MECHANISM
Original Filed Nov. 25, 1931 2 Sheets-Sheet 1
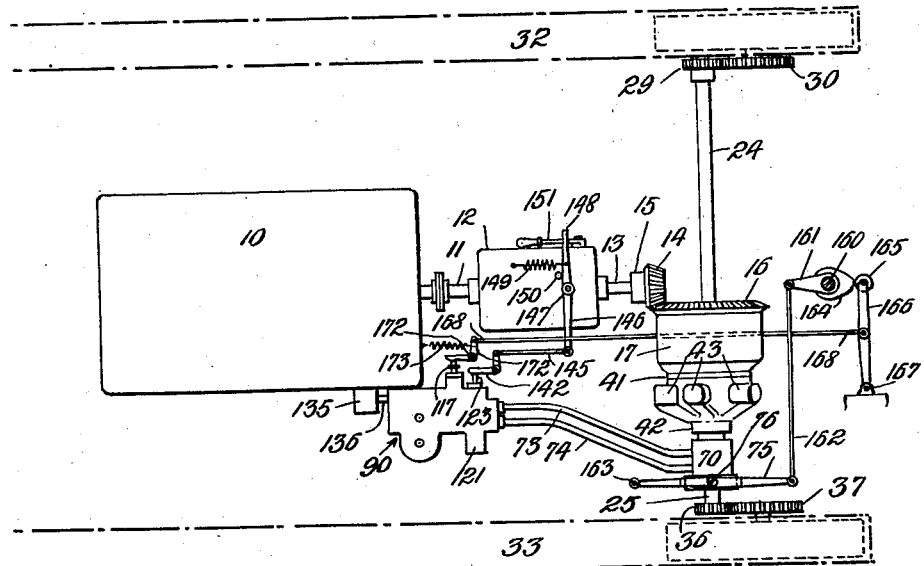
Fig. 1.
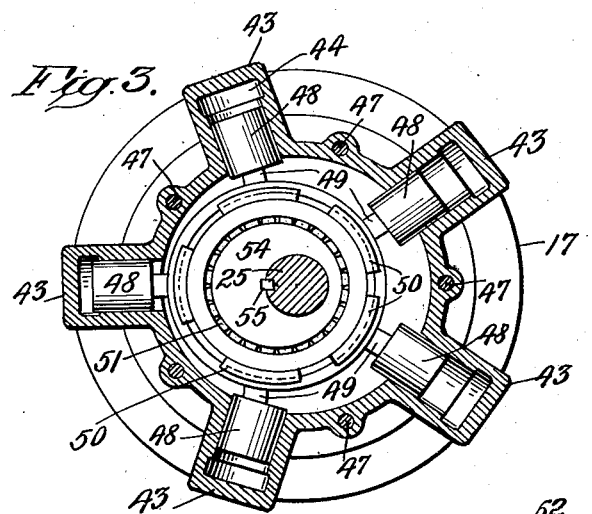
Fig. 3.
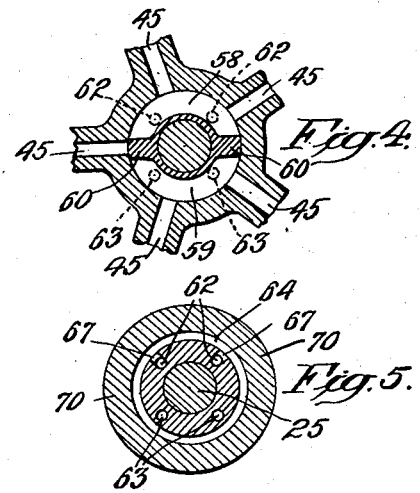
Fig. 4.
Fig. 5.
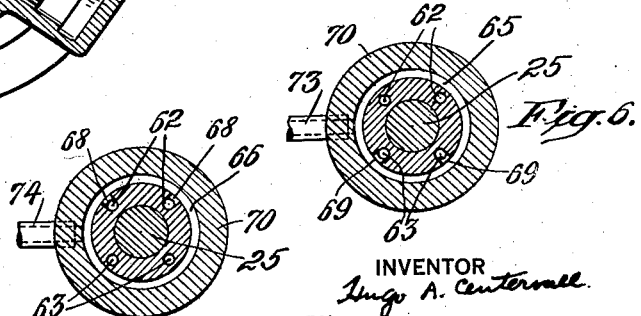
Fig. 7.
Fig. 6.
INVENTOR
Hugo A. Centervall.
BY Robert W. Byerly.
ATTORNEY June 18, 1935. H. A. CENTERVALL 2,004,929
CONTROL MEANS FOR VARYING THE RELATIVE SPEEDS OF MEMBERS
DRIVEN THROUGH A COMMON DIFFERENTIAL MECHANISM
Original Filed Nov. 25, 1931 2 Sheets-Sheet 2

INVENTOR
Hugo A. Centervall
BY Robert W. Byerly.
ATTORNEY

Patented June 18, 1935

2,004,929

UNITED STATES PATENT OFFICE 2,004,929

CONTROL MEANS FOR VARYING THE RELATIVE SPEEDS OF MEMBERS DRIVEN THROUGH A COMMON DIFFERENTIAL MECHANISM

Hugo A. Centervall, New York, N. Y., assignor to Manly Corporation, New York, N. Y., a corporation of Delaware Application November 25, 1931, Serial No. 577,264
Renewed February 23, 1934

20 Claims. (Cl. 180—9.2)

This invention relates to control means for varying the relative speeds of members driven through a common differential mechanism.

Such differential mechanisms are well known and widely used. In some instances, such as in the conventional rear axle assembly of an automobile, all that is required is that the device permit one driven member to rotate at a speed different from that of the other driven member so as to compensate for variations in their paths of travel. In other instances it is desirable to control at will the speeds of the driven members relative to each other. Well known examples of this are found in certain track-type tractors in which a differential mechanism is employed and steering is effected by varying the relative speeds of the driving axles which operate the tracks. This control has heretofore been accomplished by mechanical means, such as brakes acting upon the driving axles or clutches interposed between the differential and the driven tracks or both. These mechanical control mechanisms are necessarily large. As they are so often used, they are subject to great wear and require frequent adjustment and replacement, making them difficult and costly to maintain. Further, the driver must exert considerable effort to operate these controls which becomes a very tiresome job because of their frequent use.

Among the objects of my invention are: to provide an improved control means for varying the relative speeds of members driven through a common differential mechanism; to provide a hydraulically operated device of this class and for this purpose; to provide a control means which is simple and easy to operate so as to relieve the operator of practically all work in connection with its operation; to provide a control means that is simple, subject to little wear and requiring practically no maintenance. Other objects will appear from the description and drawings.

As track-type tractors present a well known example of the use of differential mechanisms with control means and as my device is ideally suited for use on them, I have illustrated my invention in connection with one of them; but it will be understood that my device may be used in connection with any other power transmission mechanism where such control is desired and that I do not limit my invention to use on tractors or for any special purpose.

In the drawings:—

Figure 1 is a top plan view, shown partly schematically, of a track-type tractor embodying a preferred form of my invention.

Figure 3 is a vertical cross-sectional view along the line 3—3 of Figure 2.

Figure 4 is a vertical cross-sectional view along the line 4—4 of Figure 2.

Figure 5 is a vertical cross-sectional view along the line 5—5 of Figure 2, with the parts in the certain adjustment.

Figure 6 is a vertical cross-sectional view along the line 6—6 of Figure 2, with the parts in the same adjustment as in Figure 5.

Figure 7 is a vertical cross-sectional view along the line 7—7 of Figure 2, with the parts in the same adjustment as in Figure 5.

Figure 2:
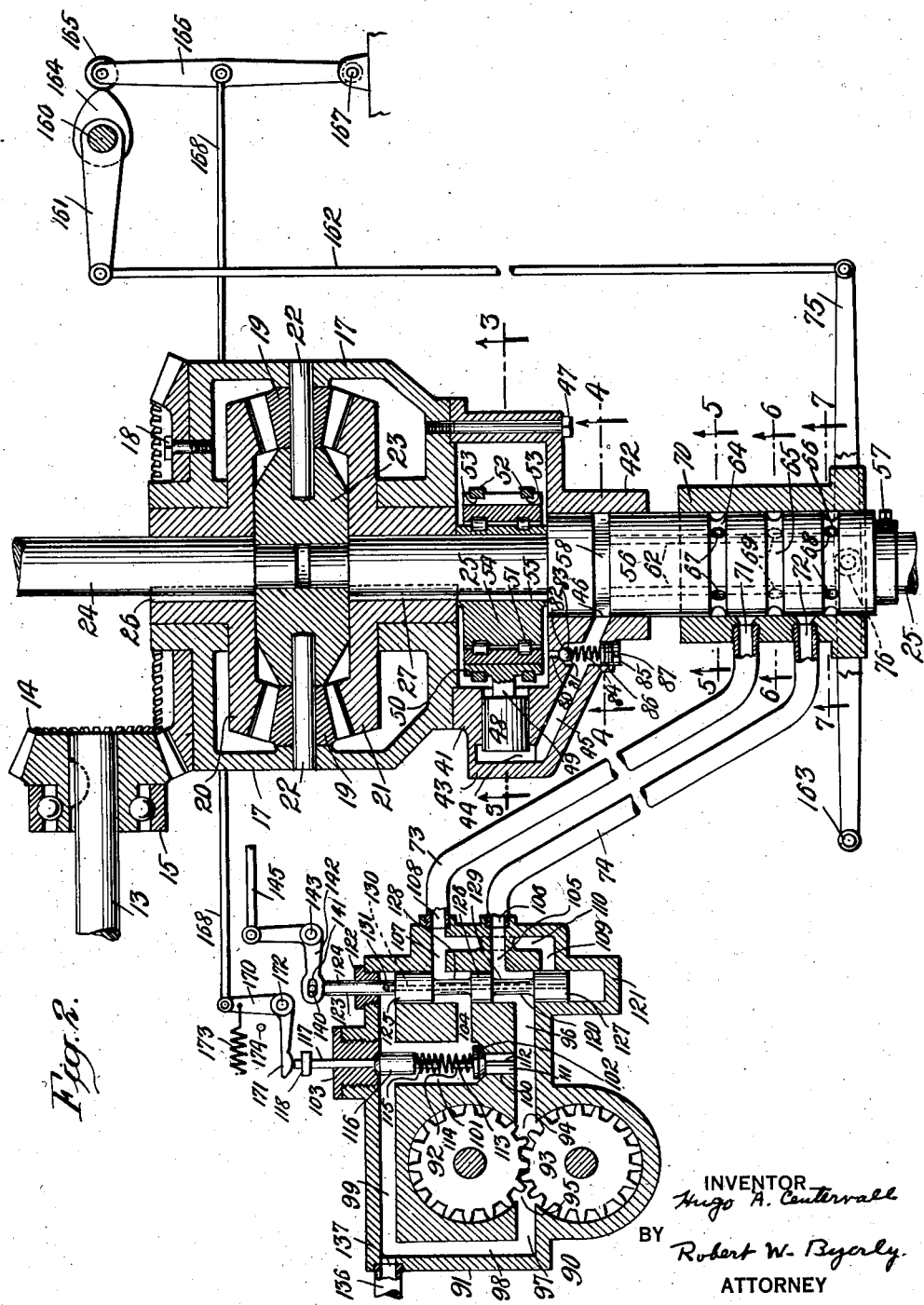
Figure 2 is an enlarged view of my control device, shown partly in section and partly schematically.

Before explaining in detail the present invention, it is to be understood that the invention is not limited in its application to the details of construction and arrangement of parts illustrated in the accompanying drawings, since the invention is capable of other embodiments and of being practiced and carried out in other ways. It is also to be understood that the phraseology or terminology reported herein is for the purpose of description and not for limitation, and it is not intended to limit the invention beyond the terms of the several claims hereto appended as considered in view of the prior art and the requirements thereof.

Referring now to the drawings, 10 designates the driving engine which is operatively connected to the rear axle assembly by means of the usual clutch, not shown, the shaft 11, the conventional change gears in the gear box 12 and the propeller shaft 13. Upon the rear end of the propeller shaft 13 is attached the bevel gear 14, mounted in suitable bearings 15 and meshing with the ring gear 16 which is attached to the differential housing 17 by any suitable means such as cap screws 18.

The differential mechanism per se forms no part of my invention and is here illustrated as a conventional type comprising bevel pinions 19 meshing with the differential bevel gears 20 and 21. The pinions 19 are rotatably mounted on pivots 22, one of the ends of which are carried by the differential housing 17 and the other ends of which are carried by the central distance piece 23 which is rotatably supported upon the adjoining inner ends of the axle shafts 24 and 25. The differential gear 20 is keyed, as at 26, to the axle shaft 24 and the differential gear 21 is keyed, as at 27, to the axle shaft 25. To the outer end of the shaft 24 is fastened the gear 29 meshing with the larger gear 30 which is operatively connected to whatever means is employed to drive the track 32 of the tractor. Similarly, to the outer end of the shaft 25 is fastened the gear 36 meshing with the larger gear 37 which is operatively connected to whatever means is employed to drive track 33.

For controlling the speeds of rotation of the axle shafts 24 and 25 relative to each other I employ a fluid motor operatively connected to the differential housing 17 and to one of the axle shafts. This motor may be of any preferred type. As here shown, it includes a hollow rotor 41 having a hub portion 42. Formed in the rotor 41 are outwardly-discharging radial cylinders 43, here shown as five in number. At the outer end of each cylinder is a port 44 communicating with a passage 45 whose other end terminates in a port 46 in the inner periphery of the hollow hub 42. The rotor 41 surrounds the axle shaft 25, its inner end being fastened as by cap screws 47 to the differential housing 17 so as to make a fluid tight joint therewith. The outer end of the rotor 41 is rotatably supported by a valve member 56 to be described later.

Slidable within the cylinders 43 are pistons 48 connected by wrist pins to the connecting rods 49 which have their inner ends enlarged to form shoes 50. These shoes 50 are disposed against the outer periphery of a bearing assembly 51 against which they are held by a pair of rings 52 located at opposite sides of the series of connecting rods and fitting within the grooves 53 in the shoes 50. The shoes 50 may slide circumferentially with respect to the bearing assembly 51 to compensate for varying angularities of the connecting rods at the various points in their paths of travel. The inner race of the bearing assembly 51 is supported upon an eccentric collar 54 mounted upon the axle shaft 25 and keyed to it as by the key 55.

The valve member 56 is formed with a central passage of proper size to receive the axle shaft 25 upon which it is concentrically mounted. The inner end of the valve member 56 is received within the hub portion 42 of the rotor 41 and forms a rotatable support for that end of the rotor. The valve member 56 is held in place relative to the rotor 41 and the eccentric collar 54 by the key 57 which keys it to the axle shaft 25.

Near the inner end of the valve member 56 are formed a pair of similar valve ports 58 and 59, separated by a transverse partition 60, these ports being adapted to register with the ports 46 in the hub 42 of the rotor 41. The valve member 56 is made of such size as to form a substantially fluid tight fit with the hub 42 while permitting its rotation within said hub. Also formed within the valve member 56 are two pairs of longitudinal passages 62 and 63. Recessed within the outer periphery of the valve member 56 are three circumferential channels 64, 65 and 66 respectively, the channel 65 being located midway between the channels 64 and 66. The pair of passages 62 connect on their inner ends with the valve port 58 and on their outer ends with the channels 64 and 66 through ports 67 and 68 respectively. Similarly, the pair of passages 63 connect on their inner ends with the valve port 59 and on their outer end with the channel 65 through the ports 69.

Surrounding the valve member 56 is the cylindrical valve housing 70 of such bore as to permit it to be moved longitudinally of the valve member 56 and to permit the valve member 56 to rotate freely within it but to form substantially fluid tight running joints with the circumferential channels 64, 65 and 66. Formed in the housing 70 are two ports 71 and 72 to which are connected flexible pipes 73 and 74 respectively. For effecting longitudinal movement of the housing 70 with respect to the valve member 56 I provide a lever 75 having an appropriate yoke which is suitably connected to the housing 70 as at 76.

There is also provided means for returning to the hydraulic circuit the fluid leaking past the pistons 48 into the interior of the rotor 41. Connecting the interior of the rotor 41 and one of the passages 45 is a passage 80 having an enlarged portion 81. The converging end of the enlarged portion 81 forms a seat 82 for a check valve 83, here shown as of the ball type, yieldingly held on its seat by one end of a spring 84. The other end of the spring 84 bears against and is held by a threaded plug 85 which closes the exterior opening 86 through which the passage 80 is conveniently bored. The outer end of the plug 85 is formed with a groove 87 so that it may be turned, as with a screw-driver, to adjust the pressure on the spring 84 to any desired amount. The arrangement is such that when there is working pressure fluid in the passage 45, the check valve 83 is held firmly on its seat and no fluid is permitted to pass through the passage 80 in either direction. When the rotor 41 has turned with respect to the valve member 56 so that this particular passage 45 contains fluid under substantially no pressure, the check valve 83 will open under any additional pressure in the interior of the rotor 41 and allow excess fluid to enter the passage 45 and thus be put back into the main circulatory system. The pressure exerted by the spring 84 is preferably made a very small amount so that the valve 83 may open under very slight pressure in the interior of the rotor 41. It will be understood, of course, that valves may be installed in one or more of the passages 45 as may be required.

Any desired source of pressure fluid may be used but in the preferred embodiment I provide a simple gear pump 90 of a well known type. This pump comprises a housing 91 in which are suitably mounted a pair of meshing gears 92 and 93. These gears are intended to be driven continuously by any suitable means whenever the engine 10 is running and in a direction of rotation which makes the port 94 the high pressure or exhaust port and the port 95 the low pressure or intake port. Formed in the housing 91 is a longitudinal passage 96 which leads from the high pressure port 94 and terminates in a valve bore 120 to be described later. Also formed in the housing 91 is a longitudinal passage 97 which leads from the intake port 95 and connects with a transverse passage 98 which in turn connects with a longitudinal passage 99 terminating in a valve bore 120. The longitudinal passages 96 and 99 are connected by a transverse passage 100 having an enlarged portion 101 whose converging end forms a seat 102 for a check valve 111 located within said enlarged portion 101. The outer end of the passage 100 and its enlarged portion 101 is closed as by a threaded plug 103, suitable packing being used to prevent leakage. The longitudinal passage 104 connects the valve bore 120 and the enlarged portion 101 of the passage 100.

Leading from the valve bore 120 and positioned intermediate the passages 96 and 104 is a longitudinal passage 105 whose outer end terminates in a port 106 to which the pipe 74 is connected. Also leading from the valve bore 120 and positioned intermediate the passages 104 and 99 is a longitudinal passage 107 whose outer end terminates in a port 108 to which the pipe 73 is connected. The passage 107 is also connected with the valve bore 120 through the transverse passage 109 which communicates with the longitudinal passage 110 positioned intermediate the passage 96 and the closed end 121 of the valve bore 120.

The check valve 111 is of standard design and its guide portion 112 is provided with longitudinal grooved passages through which fluid may easily pass when the valve is not seated. Upon the valve 111 is placed one end of a spring 113 which is held in place by the valve stem 114. There is also provided a plunger 115 whose stem 117 extends through the plug 103, suitable packing being used to prevent leakage. Formed intermediate of the ends of the plunger 115 is a shoulder 116 which forms a seat for the other end of the spring 113, the latter being held in place by the portion of the plunger 115 extending below the shoulder 116. The proportions of the parts are such that when they are in the positions shown in Figure 2 little or no pressure is exerted upon the spring 113 by the shoulder 116. The valve 111 will, therefore, be lifted from its seat 102 by the fluid in the passage 96 and the adjacent portion of passage 100 even when this fluid is under very small pressure, so that the fluid will be by-passed at substantially no pressure from the passage 96 to the intake port 95. This arrangement is provided to materially reduce the work done by the pump when the hydraulic motor is not in operation. If the plunger 115 is pushed in toward the valve 111, the shoulder 116 will tend to compress the spring 113 which will exert pressure upon the valve 111 and hold it on its seat. As fluid can no longer escape through the passage 100, the pump will almost immediately build up pressure in the passage 96. Inward movement of the plunger 115 may be limited as by a stop 118 adjustably located upon the stem 117.

To prevent the fluid pressure from becoming excessive the valve 111 in co-operation with the spring 113 acts as a safety valve. For this purpose the stem 114 and the plunger 115 are made of such length that there is always a gap between their opposing ends in all positions of their adjustment. If, therefore, the pressure in the passage 96 and the inner end of the passage 100 exceeds the amount determined by the compression of the spring 113, the valve 111 will be lifted from its seat, admitting fluid into the enlarged portion 101 and relieving the excess pressure. When the pressure has been reduced, the valve 111 will return to its seat 102. By proportioning or adjusting the parts the pressure in the passage 96 may thus be limited to any desired amount.

The plunger 115 is here shown as actuated by an arm 171 of a bell crank, pivoted as at 172, whose other arm 170 is movably connected to one end of a rod 168 to be described later. Also attached to the arm 170 is a spring 173 which is constantly under tension and so tends to pull the arm 170 toward it and hence force the plunger 115 toward the valve 111. The movement of the arm 170 toward the spring 173 is limited by a stop 174.

A reservoir 135 is provided for storing a reserve supply of fluid to replenish any leakage that may occur. This reservoir is connected, as by a pipe 136, with a port 137 formed in the pump housing 91 at the intersection of passages 98 and 99. This arrangement assures an ample supply of fluid at the intake port 95 at all times and permits the reservoir to receive any fluid returned from the hydraulic circuit in excess of the amount required to fill the main circulatory system.

Formed in the housing 91 is the transverse cylindrical valve bore 120 whose closed end 121 extends beyond the longitudinal passage 110 and whose other end is closed by the threaded plug 122. Slidable within the valve bore 120 is a piston-type valve member 123 whose stem 124 extends through an opening in the plug 122, suitable packing being used to prevent leakage. The valve member 123 is provided with three heads, 125, 126 and 127 respectively, which are separated by two interposed reduced portions 128 and 129. The three heads 125, 126 and 127 are all of equal and uniform diameter, said diameter being such as to form a substantially fluid tight fit with the bore 120 but to permit the valve member 123 to be moved longitudinally within said bore. The reduced portions 128 and 129 are likewise of equal and uniform diameter so that the opposing radial faces on each end of said reduced portions are of equal area and form a "balanced" valve member of well known type. A small longitudinal drill hole 130 extends through the valve member 123 and communicates with a radial drill hole 131 in the stem 124, providing an outlet for fluid that leaks past the head 127 into the closed end 121 of the valve bore 120.

The arrangement provided by the valve member 123 and the various passages communicating with the valve bore 120 is such that when the parts are in the positions shown in Figure 2, the pressure fluid delivered into the passage 96 by the rotating gears 92 and 93 will pass through the connected passages into the pipe 74. The pipe 73 will then be part of the low pressure or return side of the hydraulic circuit and fluid returning through it will pass through the connected passages to the intake port 95. The flow of fluid in the pipes 73 and 74 may be reversed by shifting the valve member 123 toward the closed end 121 of the valve bore 120 so that the head 127 uncovers the port formed by the intersection of the bore 120 and the passage 110. The head 126 will then cover the port formed by the intersection of the valve bore 120 and the passage 105 and the head 125 will cover the port formed by the intersection of the bore 120 and the passage 107. The high pressure passage 96 will then be connected with the pipe 73 and the intake port 95 will be connected with the pipe 74.

Means is provided for automatically shifting the valve member 123 to effect this reversal of flow of the fluid whenever the path of travel of the tractor is reversed. For this purpose the stem 124 of the valve member 123 is provided with a pin 140 loosely fitted into a slot 141 in the arm 142 of a bell crank which is pivoted as at 143. The other arm of the bell crank is movably joined to one end of a rod 145. As shown in Figure 1, the other end of the rod 145 is movably connected to one end of a lever 146 which is pivoted as at 147. A spring 149 is fastened to the lever 146 and normally holds said lever against a stop 150. The other end 148 of the lever 146 is adapted to be actuated by whatever means is used to shift the change gears to cause the tractor to travel rearwardly; this is here presumed to be a reversing lever 151 which is pulled toward the bevel gear 14 to effect such reversal. The arrangement is such that the movement of the reversing lever 151 the amount necessary to shift the change gears also causes the lever 146 to swing on its pivot 147 and through the intervening connecting members, to shift the valve member 123 into proper position to connect passage 96 with the pipe 73 and the intake port 95 with pipe 74. The valve member 123 will return to the position shown in Figure 2 when the change gears are shifted so as to cause the tractor to travel forwardly.

I also provide means whereby the operation of the hydraulic motor may be controlled by an ordinary steering wheel. 160 designates a steering post to one end of which is connected the steering wheel, not shown. Attached to the post 160 is a lever 161 which is movably joined to another lever 162 which in turn is movably connected to one end of the lever 75 which is fulcrumed as at 163. Also attached to the steering post 160 is a cam 164 against which bears a roller 165 on one end of a lever 166 which is pivoted as at 167. One end of the rod or lever 168 is movably fastened to the lever 166 intermediate of its ends. The pulling force exerted by the spring 173 through the bell crank arm 170 holds the roller 165 against the cam 164 in all positions of the cam's adjustment.

The operation of the device is as follows: The entire hydraulic circuit is filled with fluid, preferably oil. The engine 10 is started and the connections in the gear box 12 are made such as to rotate the bevel gear 14 in a clockwise direction. The tractor will then be propelled forward. With the parts in the positions shown in Figures 1 and 2, the tracks 32 and 33 will be driven at equal speeds and the tractor will move in a straight path.

If it is desired to turn the tractor toward track 33, the operator turns the steering wheel toward his left (presuming that he is facing the engine) or in a counterclockwise direction. As the steering post 160 turns it carries with it the cam 164 and the lever 161. As the cam moves, the roller 165 follows it, permitting the spring 173 to pull toward it the bell crank arm 170 until it strikes the stop 174. As the bell crank swings upon its pivot 172, its arm 171 pushes in the plunger 115 and forces the valve 111 upon its seat 102, shutting off the flow of fluid through the by-passing short circuit and causing pressure to be built up in the passage 96 and the other passages, etc. connected with it. While the parts may be proportioned as desired, as here shown a very small movement of the cam 164 causes the valve 111 to be seated.

At the same time, the lever 161 is being moved to the left or toward the track 33, forcing the lever 75 to rock on its fulcrum and moving the valve housing 70 away from the rotor 41. This movement of the housing 70 causes the port 72 to begin to register with the channel 66 and the port 71 to begin to register with the channel 65. The amount of register of these ports with these channels will vary with the distance the housing 70 is moved so that together they function as a throttle valve and accordingly regulate the amount of fluid delivered to the hydraulic motor proportionally with the amount of the register, thus varying the speed of the motor. Figures 5, 6 and 7 show the relation of the channels 64, 65 and 66 with respect to the valve housing 70 when said housing has been moved its maximum distance away from the rotor 41. Pressure fluid will then pass through the pipe 74 into the channel 66, the ports 68, the pair of passages 62 and the valve port 58. From the valve port 58 the pressure fluid will pass through all of those ports 46 then in communication with it and into their corresponding passages 45, their ports 44 and cylinders 43. Pressure will thus be exerted upon the pistons 48 and, through the connecting rods 49 and the bearing assembly 51, upon the eccentric collar 54, causing said eccentric collar to rotate in a direction opposite to that of the rotor 41 and the differential housing 17. As the eccentric collar 54 is keyed to the axle shaft 25, the speed of said shaft 25 will thus be reduced and at the same time, through the pinions 19 and the differential gears 20 and 21, the speed of the axle shaft 24 will be increased. The track 33 will, therefore, be driven at a slower speed than the track 32, causing the tractor to turn toward the track 33. Fluid exhausted by the rotating cylinders 43 will pass out through the passages 45 and the ports 46 into the valve port 59, from which it will pass through the passages 63, the ports 69, the channel 65 and the port 71 into the pipe 73 through which it will be returned to the gear pump 90.

When the operator wishes the tractor to resume a straight path of travel he merely returns the steering wheel to its neutral position and all parts of the control mechanism are likewise returned to their neutral positions, stopping the operation of the hydraulic motor. To steer toward track 32, the operator turns the wheel in a clockwise direction; the check valve 111 is then closed, pressure is built up by the gear pump 90, the valve housing 70 is moved in toward the rotor 41 and the pipe 74 is connected with the channel 65 and the pipe 73 is connected with the channel 64. The direction of flow of the fluid through the valve member 56 and the hydraulic motor is thus reversed and the eccentric collar 54 is driven in the same direction of rotation as that of the rotor 41, increasing the speed of the track 33 and decreasing the speed of the track 32. The tractor is thus turned toward track 32, the sharpness of the turn being determined by the amount of register between the ports 71 and 72 and the channels 64 and 65.

As has already been described, if the change gears are shifted so as to cause the tractor to be propelled rearwardly, the valve member 123 will automatically be shifted so as to cause pressure fluid to be delivered to the pipe 73 and to connect pipe 74 with the intake port 95 of the gear pump. Movement of the housing 70 away from the rotor 41 will then cause pressure fluid to be admitted into the valve port 59; as the differential housing 17 and the rotor 41 are now being rotated in a direction opposite to that in which they turn when the tractor is being propelled forwardly, the speed of track 32 will be increased and the speed of track 33 will be decreased, causing the tractor to turn toward track 33. Similarly, movement of the housing 70 toward the rotor 41 will cause pressure fluid to be admitted to the valve port 58, causing the speed of track 33 to be increased and the speed of track 32 to be reduced so that the tractor will turn toward track 32.

It will be observed that the operator turns the steering wheel in a counter-clockwise direction to effect steering toward track 33, both when the tractor is being propelled forwardly and rearwardly. Similarly, the steering wheel is turned in a clockwise direction to cause the tractor to turn toward track 32 in both directions of travel of the tractor.

With the controls in the neutral position as shown in Figures 1 and 2, communication is cut off between the pipes 73 and 74 and the channels 64, 65 and 66 in the valve member 56. The fluid within the valve member 56 and the hydraulic motor cannot escape and effectively locks the eccentric collar 54 against rotation with respect to the rotor 41. The differential gear 21 is therefore driven at the same speed as the differential housing 17, the pinions 19 cannot turn and the differential gear 20 is likewise prevented from turning with respect to the differential housing 17, so that both gears 20 and 21 are driven at the same speed. In the neutral position of the controls, therefore, my device produces a "locked differential" effect.

It will be observed that I have provided a simple hydraulic device for use with differential mechanisms and through which the relative speeds of each final driven member may be controlled at will. It will also be observed that the device operates only when it is desired to vary the relative speeds of the final driven members. The work to be done by it is comparatively small as it transmits no tractive power. It is easy and inexpensive to maintain as there will be little or no wear, due to its intermittent use, its relatively light load and to its perfect lubrication as oil is the fluid preferably used. My device is also simple and easy to operate, the only effort required being the small amount necessary to move the controls. When used on a track-type tractor or a similar vehicle, these controls may be operated by a steering wheel which the driver turns in the usual and natural manner to effect steering.

While I have shown the valve housing 70 as movable longitudinally of the valve member 56, it will be obvious that said housing may be made stationary and rigid pipe connections used by modifying the valve member 56 so as to have only two circumferential channels which are always in register with the ports 71 and 72 in the housing 70 and by modifying the valve member 123 and its associated valve arrangement so as to permit them to perform the functions of both throttling and reversing valves, suitable changes being made in the controls.

What I claim is:

1. A device for varying the relative speeds of members driven through a common differential mechanism, comprising a hydraulic motor, means operatively connecting said motor to one of said driven members, a fluid pump, fluid connections between said pump and motor, and means independent of said pump for controlling the direction of rotation of said motor.

2. A device for varying the relative speeds of members driven through a common differential mechanism, comprising a hydraulic motor, means operatively connecting said motor to one of said driven members, a fluid pump, fluid connections between said pump and motor, and means independent of said pump for controlling the volume of fluid delivered to the motor.

3. A device for varying the relative speeds of members driven through a common differential mechanism, comprising a hydraulic motor, means operatively connecting said motor to one of said driven members, a fluid pump, fluid connections between said pump and motor, and means independent of said pump for controlling the direction of rotation of said motor and for controlling the volume of fluid delivered to the motor.

4. A device for varying the relative speeds of members driven through a common differential mechanism, comprising a plurality of driven members, differential gearing intermediate said driven members, a hydraulic motor operatively connected to one of said driven members, a valve having alternative fluid circuits communicating with said motor, a valve housing slidably mounted on said valve, and a plurality of ports in said housing adapted to register with either of said alternative valve circuits.

5. A device for varying the relative speeds of members driven through a common differential mechanism, comprising a hydraulic pump, a hydraulic motor operatively connected to one of said driven members and to the compensating element of said differential mechanism, a valve member having alternative fluid circuits, means for circulating fluid through either of said circuits alternatively and throttle means for cutting off said circulation and preventing the escape of fluid from said valve member.

6. In a device for varying the relative speed of two driven shafts through a common differential mechanism the combination of a plurality of differential gears keyed to said respective shafts, a housing for the differential assembly, means for rotating said housing, a fluid motor having one element operatively connected with one of said shafts and another element operatively connected with said housing whereby the speed of rotation of one of said shafts may be made greater and the speed of rotation of the other of said shafts less than the speed of rotation of said housing.

7. A device for varying the relative speed of two driven shafts through a common differential mechanism comprising a plurality of differential gears keyed to said respective shafts and a housing, means for rotating said housing, a fluid motor operatively connected to one of said shafts whereby the speed of rotation of one of said shafts may be varied with respect to the other of said shafts, a fluid pump for actuating said fluid motor, a valve member intermediate said pump and motor, a plurality of fluid circuits extending through said valve member, fluid connections between said pump and said valve, and means for bringing said fluid connections into communication with either of said fluid circuits.

8. In a device for varying the relative speed of two driven shafts through a common differential mechanism, a rotary fluid motor operatively connected to one of said shafts, a rotary valve member having a number of fluid passageways communicating at one end with said motor, circumferential ports in said valve with which the said fluid passageways communicate at the other end, a non-rotatable housing surrounding said rotary valve and forming a running joint therewith, and ports in said housing adapted to communicate simultaneously with a plurality of said circumferential ports.

9. In a device for varying the relative speed of two driven members, the combination of two shafts, a rotatable differential assembly interposed between said shafts, means for rotating said assembly, a fluid motor comprising an eccentric element and a cylinder element, operative connections between one of said motor elements and one of said driven shafts and between the other of said motor elements and the compensating element of said differential assembly, a supply of fluid under pressure, means for supplying fluid to and exhausting it from said motor, and a valve member for regulating the circulation of fluid to and from said motor.

10. In a device for varying the relative speed of two driven members through a common differential mechanism, a rotary fluid motor operatively connected to one of said members, said motor comprising a rotor having a number of radially arranged cylinders therein, fluid passages forming part of the main fluid circuit communicating with each of said cylinders, pistons in said cylinders and means for returning to the main circuit any fluid leaking past said pistons comprising a passage communicating between said fluid passage and the interior of said rotor, said passage being normally closed by a check valve adapted to open under a predetermined pressure in the interior of the rotor.

11. In a device for varying the relative speeds of members driven through a common differential means, the combination of a plurality of driven members, a differential assembly intermediate said driven members, a fluid motor operatively connected to one of said driven members, a fluid pump, fluid connections between said pump and said motor and means interposed between said pump and motor whereby the volume of fluid delivered to the motor may be controlled.

12. A device for steering a motor vehicle by varying the relative speed of its driven members comprising driving means for propelling said tractor, driven shafts for each of said tracks, differential gear mechanism intermediate said shafts, and a housing therefor engageable with the main driving means, a rotary fluid motor operatively connected with one of said driven shafts to modify the speed imparted to said shaft by the main driving means, a fluid pump and fluid conduits joining said pump and motor, a means for reversing the flow of fluid in said conduits, and automatic means for actuating said first means when the direction of travel of said tractor is reversed.

13. A device for steering a motor vehicle by varying the relative speed of its driven members through a common differential mechanism comprising shafts associated with each of said tracks, a differential assembly intermediate said shafts, a rotatable housing therefor, driving means for propelling said tractor operatively connected to said housing, a rotary fluid motor operatively connected with one of said driven shafts to modify the speed imparted to said shaft by the main driving means, a fluid pump and fluid conduits joining said pump and motor, a means for reversing the flow of fluid in said conduits, automatic means for actuating said reversing means when the direction of travel of said tractor is reversed, a valve member intermediate said pump and motor having a plurality of alternative fluid passages therein, and means to vary the volume of fluid in said passages and the path of fluid through said valve.

14. A device for steering a motor vehicle by varying the relative speed of its driven members through a common differential mechanism comprising two driven shafts associated with each of said tracks respectively, differential mechanism intermediate said shafts, driving means for propelling said tractor, a rotary fluid pump operatively connected with one of said shafts to modify the speed imparted to said shaft by the main driving means, a fluid pump and fluid conduits joining said pump and motor, steering control means for guiding said tractor, a valve member intermediate said pump and said motor, said valve having a plurality of ports adapted to communicate respectively with the high pressure and low pressure sides of said motor, separate fluid circuits through said valve member communicating with said separate ports, and means operable by said steering control means for connecting said fluid conduits with either of said valve fluid circuits, and for controlling the volume of fluid in said conduits.

15. A device for steering a motor vehicle by varying the relative speed of its driven members through a common differential mechanism intermediate driven shafts associated with each of said tracks comprising a main source of power, means for propelling said tractor, a rotary fluid motor operatively connected with one of said driven shafts to modify the speed imparted to said shaft by the main driving means, a fluid pump and fluid conduits joining said pump and motor, steering control means for guiding said tractor, a by-pass valve in said pump operatively connected with said steering control means, means intermediate said pump and motor to control the speed and direction of rotation of said motor, said means being also operatively connected to said steering control means.

16. A device for varying the relative speed of two driven members through a common differential means, comprising a fluid pump, a rotary fluid motor operatively connected to one of said driven members, a fluid circuit between said pump and motor, and control valve means whereby the quantity of fluid passing from said pump to said motor may be varied from zero to maximum in either direction of flow in the portion of said circuit intermediate said control valve means and said motor.

17. A device for varying the relative speeds of members driven through a common differential mechanism comprising a fluid pump, inlet and outlet fluid passages in said pump a fluid passage interconnecting said inlet and outlet passages, and a valve adapted normally to close said interconnecting passage, but supported yieldingly in such a manner that it will serve as a combined by-pass and pressure-relief valve.

18. A device for varying the relative speeds of members driven through a common differential mechanism comprising a reversible motor operatively connected with said differential and in speed modifying relation to one of said driven members, energy-supplying means independent of said differential mechanism for driving said motor, and control means regulating the operation of said motor and including means for causing said motor to rotate in either direction with respect to said differential mechanism.

19. A device for varying the relative speeds of members driven through a common differential mechanism comprising a fluid motor having one element operatively connected with said differential and another element operatively connected with one of said driven members, said elements being rotatable with and with respect to each other, and control means regulating the operation of said motor.

20. A device for varying the relative speeds of members driven through a common differential mechanism comprising a reversible fluid motor operatively connected with said differential and in speed modifying relation to one of said driven members, a source of fluid pressure, and control means regulating the volume and direction of flow of said pressure fluid delivered to said motor to control said speed modifying action of said motor.

HUGO A. CENTERVALL.